United States Patent
Danskin et al.

(10) Patent No.: US 7,830,392 B1
(45) Date of Patent: Nov. 9, 2010

(54) CONNECTING MULTIPLE PIXEL SHADERS TO A FRAME BUFFER WITHOUT A CROSSBAR

(75) Inventors: John M. Danskin, Providence, RI (US); Steven E. Molnar, Chapel Hill, NC (US); John S. Montrym, Los Altos Hills, CA (US); Mark French, Raleigh, NC (US); John H. Edmondson, Arlington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 974 days.

(21) Appl. No.: 11/612,415

(22) Filed: Dec. 18, 2006

Related U.S. Application Data

(60) Provisional application No. 60/752,265, filed on Dec. 19, 2005.

(51) Int. Cl.
  *G06F 12/02* (2006.01)
  *G06F 15/80* (2006.01)
  *G06F 15/50* (2006.01)
  *G09G 5/00* (2006.01)

(52) U.S. Cl. .................. 345/544; 345/426; 345/505; 345/612

(58) Field of Classification Search .............. 345/505, 345/544, 581, 612, 426; 712/10–22
See application file for complete search history.

(56) References Cited

U.S. PATENT DOCUMENTS

| 7,075,542 B1* | 7/2006 | Leather ..................... 345/506 |
| 7,633,506 B1* | 12/2009 | Leather et al. ............ 345/506 |
| 2002/0174318 A1 | 11/2002 | Stuttard et al. |

* cited by examiner

*Primary Examiner*—Hau H Nguyen
(74) *Attorney, Agent, or Firm*—Townsend and Townsend and Crew LLP

(57) ABSTRACT

The number of crossbars in a graphics processing unit is reduced by assigning each of a plurality of pixels to one of a plurality of pixel shaders based at least in part on a location of each of the plurality of pixels within an image area, generating an attribute value for each of the plurality of pixels using the plurality of pixel shaders, mapping the attribute value of each of the plurality of pixels to one of a plurality of memory partitions, and storing the attribute values in the memory partitions according to the mapping. The attribute value generated by a particular one of the pixel shaders is mapped to the same one of the plurality of memory partitions.

10 Claims, 7 Drawing Sheets

|   |   |   |   |   |   |   |   |   |     |   |
|---|---|---|---|---|---|---|---|---|-----|---|
| 0 | 1 | 2 | 3 | 4 | 5 | 6 | 7 | 0 | 1 | ... | 4 |
| 5 | 6 | 7 | 0 | 1 | 2 | 3 | 4 | 5 | 6 | ... | 1 |
| 2 | 3 | 4 | 5 | 6 | 7 | 0 | 1 | 2 | 3 | ... | 6 |
| 7 | 0 | 1 | 2 | 3 | 4 | 5 | 6 | 7 | 0 | ... | 3 |
| 4 | 5 | 6 | 7 | 0 | 1 | 2 | 3 | 4 | 5 | ... | 0 |
| 1 | 2 | 3 | 4 | 5 | 6 | 7 | 0 | 1 | 2 | ... | 5 |
| 6 | 7 | 0 | 1 | 2 | 3 | 4 | 5 | 6 | 7 | ... | 2 |
| 3 | 4 | 5 | 6 | 7 | 0 | 1 | 2 | 3 | 4 | ... | 7 |

FIG. 4

CONNECTING MULTIPLE PIXEL SHADERS TO A FRAME BUFFER WITHOUT A CROSSBAR

CROSS-REFERENCES TO RELATED APPLICATIONS

The present application claims the benefit of U.S. Provisional Application No. 60/752,265, filed Dec. 19, 2005, which is incorporated herein by reference in its entirety for all purposes.

The present application is related to the following commonly-assigned co-pending U.S. patent application Ser. No. 11/290,303, filed Nov. 29, 2005; application Ser. No. 11/289,828, filed Nov. 29, 2005; and application Ser. No. 11/311,993, filed Dec. 19, 2005, which are incorporated in their entirety, herein, by reference for all purposes.

BACKGROUND OF THE INVENTION

The present invention relates in general to graphics processors, and in particular to parallel array architecture for a graphics processor.

Parallel processing techniques enhance throughput of a processor or multiprocessor system when multiple independent computations need to be performed. A computation can be divided into tasks that are defined by programs, with each task being performed as a separate thread. (As used herein, a "thread" refers generally to an instance of execution of a particular program using particular input data, and a "program" refers to a sequence of executable instructions that produces result data from input data.) Parallel threads are executed simultaneously using different processing engines inside the processor.

Numerous existing processor architectures support parallel processing. The earliest such architectures used multiple discrete processors networked together. More recently, multiple processing cores have been fabricated on a single chip. These cores are controlled in various ways. In some instances, known as multiple-instruction, multiple data (MIMD) machines, each core independently fetches and issues its own instructions to its own processing engine (or engines). In other instances, known as single-instruction, multiple-data (SIMD) machines, a core has a single instruction unit that issues the same instruction in parallel to multiple processing engines, which execute the instruction on different input operands. SIMD machines generally have advantages in chip area (since only one instruction unit is needed) and therefore cost; the downside is that parallelism is only available to the extent that multiple instances of the same instruction can be executed concurrently.

Conventional graphics processors use wide SIMD architectures to achieve high throughput in image-rendering applications. Such applications generally entail executing the same programs (vertex shaders or pixel shaders) on large numbers of objects (vertices or pixels). Since each object is processed independently of all others but using the same sequence of operations, a SIMD architecture provides considerable performance enhancement at reasonable cost. Some GPU architectures include an SIMD core that executes vertex shader programs and another SIMD core that executes pixel shader programs. Other GPUs have a unified shader architecture, in which a single SIMD core executes vertex and pixel shader programs. In high-end GPUs, multiple sets of SIMD cores may be provided to support an even higher degree of parallelism.

Moreover, graphics processing includes the manipulation, processing and displaying of images on video display screens. In order to process images efficiently, different components of the GPU specialize in performing different tasks. For example GPUs can include vertex processing units, texture units, color fragment processing units, Z-fragment processing units, etc. In order to process images using these different components, large amounts of data must be quickly and reliably transferred between the memory and the different components. The transfer of data between the different components and the memory can be done with crossbars that appropriately route data. These crossbars are implemented using tens of thousands of wires. As technology progresses, these crossbars become larger in proportion to the square of the degree of parallelism. This significantly degrades the degree to which GPUs can take advantage of improvements in process technology.

It would therefore be desirable to provide a graphics processor that reduces the number of crossbars without affecting performance.

BRIEF SUMMARY OF THE INVENTION

Embodiments of the present invention remove the necessity for crossbars between pixel shaders and fragment processors as well as the necessity for crossbars between Z processing fragment shaders and color processing fragment shaders while still providing graphics processors that use a scalable multithreaded core array to execute vertex shader programs, geometry shader programs, and/or pixel shader programs in any combination during rendering operations. The core array includes a number of multithreaded processing cores arranged in one or more clusters, with cores in the same cluster being controlled by a shared core interface.

In embodiments where a pixel shader program is to be executed, the cluster or core in which the program is to be executed is advantageously selected based on the location of the pixel within the image area. In one embodiment, the screen is tiled, with each tile being assigned to one or another of the processing clusters (or to a specific core within a processing cluster). The tiles assigned to a given processing cluster or core are advantageously scattered across the screen to provide approximate load balancing.

In some embodiments, the processing core or cluster includes a raster operations unit that integrates newly generated pixel data with existing data in a frame buffer. The frame buffer can be partitioned to match the number of processing clusters, with each cluster writing all of its data to one partition. In other embodiments, the number of partitions of the frame buffer need not match the number of processing clusters in use.

In one embodiment of the invention a method for writing graphics data to a memory having a plurality of memory partitions includes assigning each of a plurality of pixels to one of a plurality of pixel shaders based at least in part on a location of each of the plurality of pixels within an image area, generating an attribute value for each of the plurality of pixels using the plurality of pixel shaders, mapping the attribute value of each of the plurality of pixels to one of a plurality of memory partitions, wherein the attribute value generated by a particular one of the pixel shaders is mapped to the same one of the plurality of memory partitions, and storing the attribute values in the memory partitions according to the mapping.

In another embodiment of the invention, the method further includes generating a plurality of attribute values, wherein all of the attribute values for a particular one of the plurality of pixels are mapped to the same one of the plurality of memory partitions.

In yet another embodiment of the invention, each attribute value has an associated ElementSize and the mapping further includes selecting an ElementStride and determining a PartitionStride by multiplying the ElementStride with the ElementSize.

In yet another embodiment of the invention, each pixel has (X,Y) coordinates, and the method further includes generating a PhysicalAddress value equal to SurfaceOffset+ElementSize*(X+SurfaceWidth*Y), wherein the PhysicalAddress is an address in the memory where the attributes are sent.

In yet another embodiment of the invention, the method further includes generating a Partition value equal to (PhysicalAddress/PartitionStride)%nPartitions, wherein the Partition value is used to identify a partition in the memory.

In yet another embodiment of the invention, the method further includes imposing a further constraint on the PhysicalAddress.

In yet another embodiment of the invention, the constraint includes requiring that (SurfaceOffset/PartitionStride)%nPartitions be a constant K.

In yet another embodiment of the invention, the constraint is satisfied by setting SurfaceOffset/ElementSize to be a multiple of nPartitions.

In another embodiment of the invention, a graphics processor includes a multithreaded core array that includes a plurality of processing clusters, where each processing cluster includes at least one processing core operable to execute a pixel shader program that generates a pixel attribute value. Each of a plurality of pixels is assigned to one of the plurality of processing clusters based at least in part on a location of the pixel within an image area. The graphics processor also includes a pixel distribution logic configured to deliver a coverage data from a rasterizer to one of the processing clusters in the multithreaded core array, wherein the pixel distribution logic selects the one of the processing clusters to which the coverage data for a first pixel is delivered based at least in part on a location of the first pixel within an image area. The graphics processor also includes a plurality of raster operation units (ROPs), each ROP coupled to a different one of the plurality of processing clusters and adapted to be coupled to a different one of a plurality of memory partitions adapted to store pixel attribute values, wherein each memory partition stores pixel attribute values for pixels assigned to a different one of the plurality of processing clusters. Each ROP is also configured to update the pixel attribute values stored in the one of the memory partitions coupled thereto using the pixel attribute values generated by the one of the processing clusters coupled thereto.

In yet another embodiment of the invention, each of the ROPs is configured to perform Z-processing and color processing of the attribute values.

In yet another embodiment of the invention, the core is configured to execute a pixel shader program to determine attributes.

In yet another embodiment of the invention, each pixel has (X,Y) coordinates, and the ROP in the graphics processor is further configured to select an ElementStride and determine a PartitionStride by multiplying the ElementStride with an ElementSize, assign a PhysicalAddress value equal to SurfaceOffset+ElementSize*(X+SurfaceWidth*Y). The ROP is also configured to assign a Partition value equal to (PhysicalAddress/PartitionStride)%nPartitions.

In yet another embodiment of the invention, the ROP is further configured to impose a constraint on the PhysicalAddress.

In yet another embodiment of the invention, the constraint includes requiring that (SurfaceOffset/PartitionStride)%nPartitions is a constant K.

In yet another embodiment of the invention, the constraint is satisfied by setting SurfaceOffset/ElementSize to be a multiple of nPartitions.

In yet another embodiment of the invention, the pixel shader program is configured to generate a plurality of pixel attribute values, and wherein all the attribute values of one pixel are mapped to the same memory partition.

In yet another embodiment of the invention, the graphics processor further includes a texture pipeline, wherein the multithreaded core array, the texture pipeline, and the ROP are all located on a single chip.

In another embodiment of the invention, a graphics processor includes a multithreaded core array that includes a plurality of processing clusters, each processing cluster includes at least one processing core operable to execute a pixel shader program that generates one or more pixel attribute values from coverage data, a rasterizer configured to generate coverage data for each of a plurality of pixels, a pixel distribution logic configured to deliver the coverage data from the rasterizer to one of the processing clusters in the multithreaded core array, wherein the pixel distribution logic selects the one of the processing clusters to which the coverage data for a first pixel is delivered based at least in part on a location of the first pixel within an image area. The graphics processor also includes a plurality of raster operation units (ROPs), where each ROP is coupled to a different one of the plurality of processing clusters and adapted to be coupled to a different one of a plurality of memory partitions adapted to store pixel attribute values, wherein each memory partition stores pixel attribute values for pixels assigned to a different one of the plurality of processing clusters, and wherein each ROP is configured to update the pixel attribute values stored in the one of the memory partitions coupled thereto using the pixel attribute values generated by the one of the processing clusters coupled thereto.

The following detailed description together with the accompanying drawings will provide a better understanding of the nature and advantages of the present invention.

BRIEF DESCRIPTION OF THE DRAWINGS

FIG. 4 illustrates one possible tiling of an image area into a number of tiles according to an embodiment of the present invention.

DETAILED DESCRIPTION OF THE INVENTION

System Overview

Figure 1:
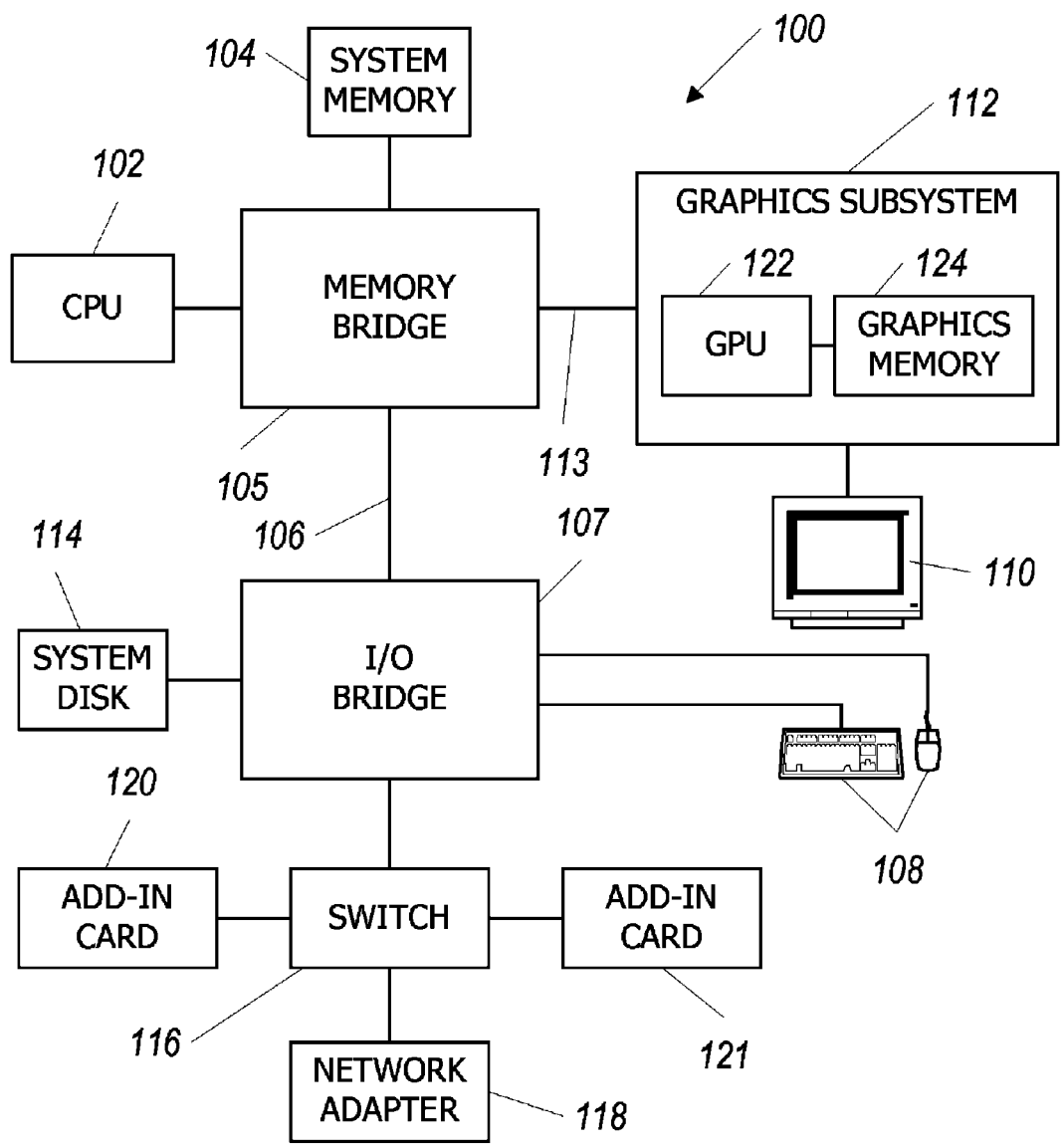
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Accelerated Graphics Port), Hyper-Transport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
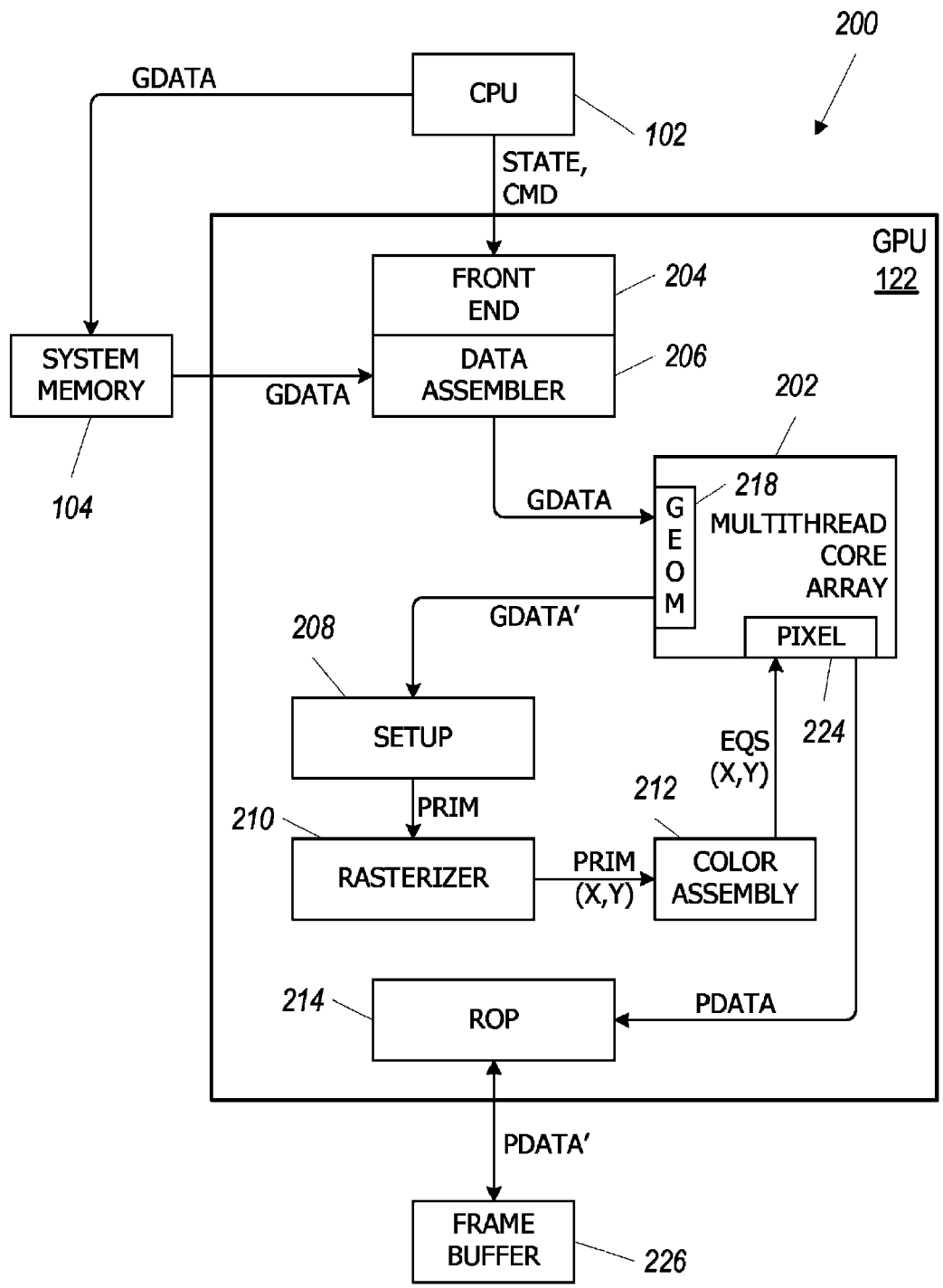
FIG. 2 is a block diagram of a rendering pipeline that can be implemented in a graphics processor according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a pixel shader program to interpolate a value for the attribute at any location within the primitive; conventional techniques can be used to generate the equations. For instance, in one embodiment, color assembly module 212 generates coefficients A, B, and C for a plane equation of the form $U=Ax+By+C$ for each attribute U.

Color assembly module 212 provides the attribute equations (EQS, which may include e.g., the plane-equation coefficients A, B and C) for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operate as a geometry shader, receiving and executing geometry program instructions; and at still other times the same processing engine may operate as a pixel shader, receiving and executing pixel shader program instructions. It will be appreciated that the multithreaded core array can provide natural load-balancing between pixel and vertex processing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly controls a different subset of the processing engines in multithreaded core array 202.

Multithreaded Core Array Configuration

Figure 3:
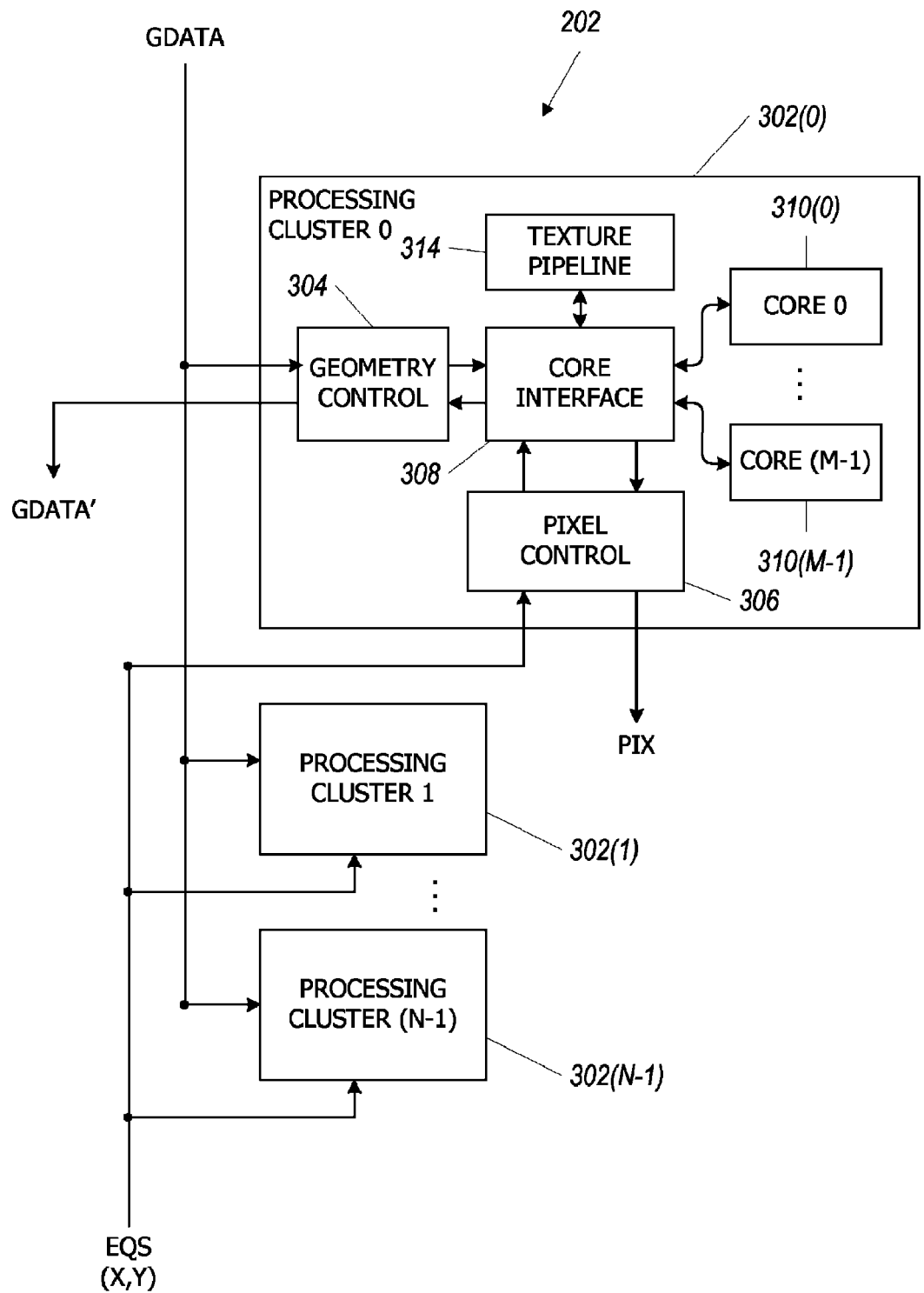
FIG. 3 is a block diagram of a multithreaded core array for a graphics processor according to an embodiment of the present invention.

In one embodiment, multithreaded core array 202 provides a highly parallel architecture that supports concurrent execution of a large number of instances of vertex, geometry, and/or pixel shader programs in various combinations. FIG. 3 is a block diagram of multithreaded core array 202 according to an embodiment of the present invention.

In this embodiment, multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads. In one embodiment, each core 310 implements a P-way SIMD architecture to execute P threads in parallel, where P is an arbitrary integer (e.g., 8, 16, 32) and is capable of managing a number G (e.g. 18, 24, etc.) of groups of P threads concurrently. A detailed description of core 310 can be found in U.S. Provisional Application No. 60/752,265, filed Dec. 19, 2005, which is incorporated herein by reference in its entirety for all purposes.

Core interface 308 also controls a texture pipeline 314 that is shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308. Texture processing by pipeline 314 may consume a significant number of clock cycles, and while a thread is waiting for the texture result, core 310 advantageously continues to execute other threads.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. Upon completion of the vertex shader program, core interface 308 signals geometry controller 304. If a geometry shader program is to be executed, geometry controller 304 instructs core interface 308 to launch the geometry shader program. In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GDATA') to setup module 208 of FIG. 2.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources or the location of the primitive in screen coordinates, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 310(0) of each processing cluster. Such design choices may be driven by considerations of hardware size and complexity versus performance, as is known in the art. A shared texture pipeline is also optional; in some embodiments, each core might have its own texture pipeline or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it. In still another embodiment, processing clusters are selected based on properties of the input data, such as the screen coordinates of pixels to be processed.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Allocation of Pixel Shader Work

In accordance with an embodiment of the present invention, pixels to be processed by a pixel shader program are directed to a processing cluster 302 (FIG. 3) based on the position of the pixels within the image area. For example, the image area can be divided into a number of tiles. Each tile is associated with one of the processing clusters 302 in such a way that the tiles associated with one cluster are scattered across the image area (i.e., at least some of the tiles associated with one processing cluster are not contiguous with one another).

FIG. 4 illustrates one possible tiling of an image area 400 into a large number of tiles 402 according to an embodiment of the present invention. Each tile 402 might be, e.g., 16×16 pixels or any other convenient size. In this embodiment, multithreaded core array 202 of FIG. 3 includes eight processing clusters 302(0) through 302(7). Each tile 402 in FIG. 4 contains a number i (0 through 7) indicating which processing core 302(i) processes pixels in that tile. As can be seen in FIG. 4, each processing cluster 302 is assigned an equal (or nearly equal) number of tiles 402 within image area 400, and the tiles assigned to each cluster 302 are not contiguous with each other. It is expected that for many graphics applications, distributing work in this manner will provide approximate load balancing among the processing clusters 302. Suitable pixel distribution logic can be included in rendering pipeline 200, e.g., in color assembly module 212 of FIG. 2.

It will be appreciated that the tiling shown in FIG. 4 is illustrative and that variations and modifications are possible. The tiles may be of any size. In some embodiments, the size and number of tiles is configurable, with tile size being chosen based on application characteristics such as whether a multisampling mode is in use. The arrangement of tiles assigned to each processing cluster can vary as desired.

Tiles may be assigned to any number of processing clusters, up to the total number that are present in a particular GPU. In some embodiments, tiles are assigned to fewer than all of the processing clusters. Thus, a GPU can render images using only some of its processing clusters to process pixel threads. As long as at least one processing cluster is available, the GPU will be able to render images, albeit at reduced throughput. Running with some clusters disabled from processing pixel threads may be useful, e.g., for operating in a reduced-power mode (some cores or clusters can be powered down while others operate), for determining minimum performance requirements (without requiring the availability of different GPUs), and/or for providing tolerance against defects in one or another of the cores.

In some alternative embodiments, tiles are assigned to particular cores 310 rather than to processing clusters 302.

Pixel Shader Coupling to Frame Buffer

In some embodiments, rather than the centralized ROP 214 suggested in FIG. 2, each pixel controller 306 in FIG. 3 includes its own ROP that communicates pixels to frame buffer 226 of FIG. 2. In such embodiments, a coupling from processing clusters 302 to the frame buffer is provided.

In one embodiment with N processing clusters, frame buffer 226 is partitioned into N partitions. Each cluster 302 is coupled to a different one of the N partitions.

Figure 5:
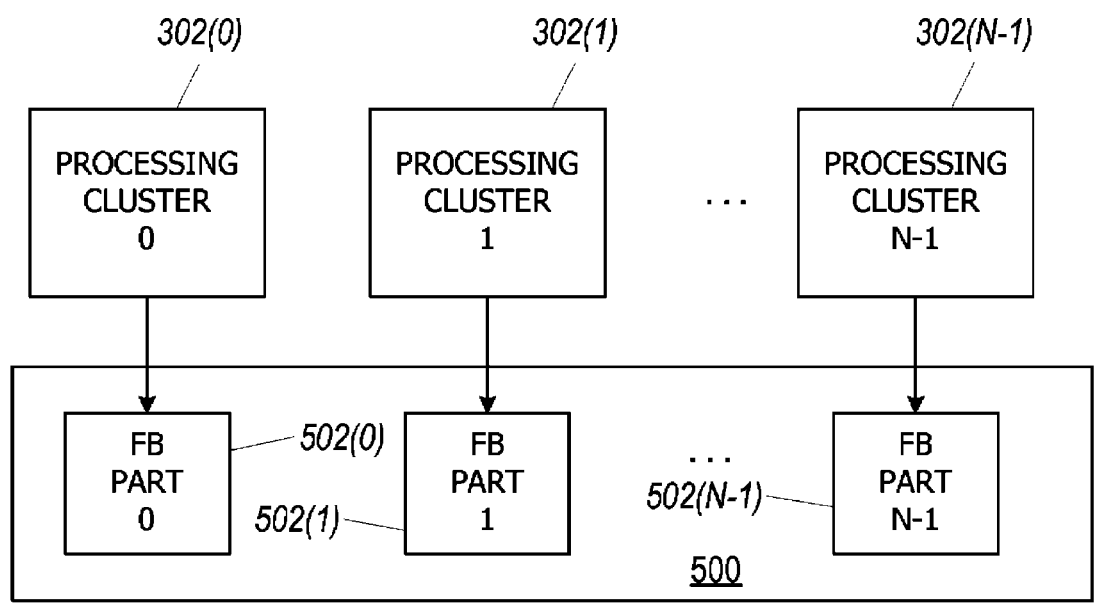
FIG. 5 is a simplified block diagram illustrating a coupling between processing clusters and a frame buffer according to an embodiment of the present invention.

FIG. 5 is a simplified block diagram illustrating a coupling between processing clusters 302 and a frame buffer 500 according to an embodiment of the present invention. It is to be understood that frame buffer 226 of FIG. 2 might include multiple frame buffers 500, where each frame buffer 500 stores a specified quantity on a per-pixel basis for the same image. For instance, in one embodiment, frame buffer 226 includes a Z buffer; color component buffers (e.g., for red, green and blue color components); and a transparency (alpha) buffer. It is to be understood that any number of frame buffers 500 may be provided and that "pixel" as used herein refers to sampling locations within the image, which might or might not correspond to the number of active pixels in a given display device. For simplicity, only one frame buffer 500 is shown; it is to be understood that the same partitioning can be applied to each frame buffer for an image. Frame buffer partitions, which are illustrated in FIG. 5 as FB PART 0, ..., N−1 (502(0), ..., 502(N−1)), are partitions of memory located within the graphics memory 124 (FIG. 1).

Frame buffer 500 is partitioned (physically or logically) into N partitions 502, with each partition being large enough to store the data for at least 1/N of the pixels in the image. Each of the N processing clusters 302 is coupled to one of the N partitions 502. Thus, processing cluster 302(0) stores all of its output pixel data in partition 502(0), processing cluster 302(1) in partition 502(1) and so on. It should be noted that to the extent that tiles processed by a given processing cluster 302 are not contiguous, the data in a given frame buffer partition 502 will be from non-contiguous tiles. The display (scanout) logic advantageously observes the correct display ordering of the data when accessing frame buffer 500; in particular, it is not required that partitions be read out sequentially.

As noted above, in some embodiments, fewer than all of processing cores 302 might be used to generate pixels. In the embodiment shown in FIG. 5, only processing cluster 302(0) provides pixels to frame buffer partition 502(0). Accordingly, if processing cluster 302(0) is not operated to generate pixels, frame buffer partition 502(0) will not be used. The image area can be retiled or tiles can be reassigned among processing clusters 302(1) through 302(N−1) such that the area is divided among N−1 processing clusters. In some embodiments, the sampling resolution might need to be reduced, e.g., if frame buffer partitions 502(1) through 502(N−1) do not provide enough space to store all of the pixel data for the image at the original sampling resolution. In embodiments where the partitions are logical rather than physical, frame buffer 500 can be repartitioned to match the number of processing clusters 302 available.

Figure 6:
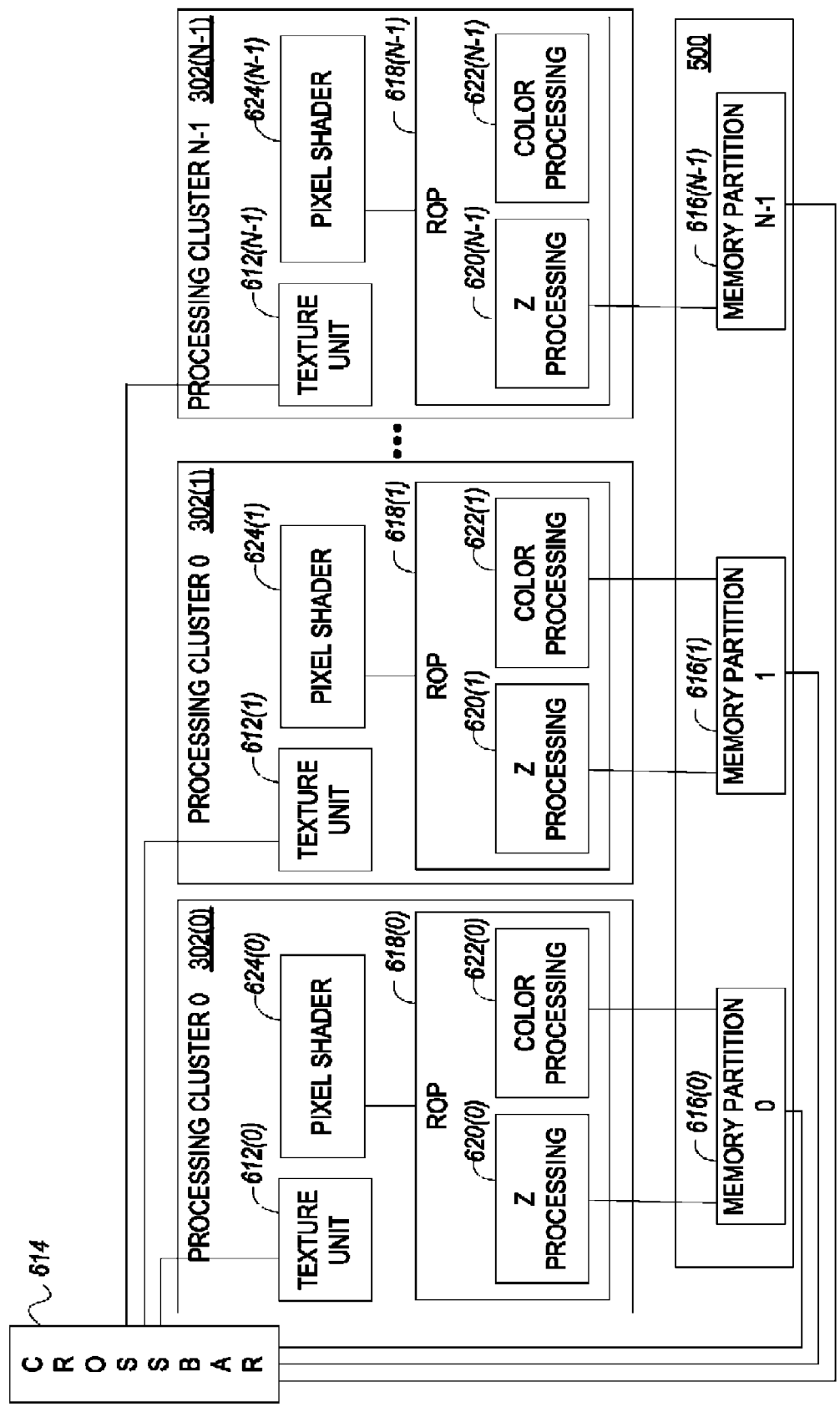
FIG. 6 is a block diagram illustrating further details of the coupling between the processing core and frame buffer partition in a computer system without crossbars between the pixel shader and the fragment processor and without crossbars between the Z processing fragment shader and the color processing fragment shader, in accordance with an embodiment of the invention.

FIG. 6 illustrates further details of the coupling between a representative processing clusters 302(0, 1, ..., N−1) and memory. The data used to represent an image that will be displayed is stored in one of the frame buffer partitions 502(0) through 502(N−1) located in memory module 502. Processing clusters 302(0, 1, ..., N−1) include texture units 612(0, 1, ..., N−1), ROPs 618(0, 1, ..., N−1), and pixel shaders 624(0, 1, ..., N−1). Pixel shaders 624 may operate in cores 310 of FIG. 3. ROPs 618(0, 1, ..., N−1) further include Z-processing modules 620(0, 1, ..., N−1) and color processing module 622(0, 1, ..., N−1), respectively. Texture units 612(0, 1, ..., N−1) are modules that handle textures for images (e.g. texture pipeline 314 as described above with reference to FIG. 3.) Textures are collections of color or other attribute data stored in memory. The texture unit reads this attribute data from frame buffer 500, applies a filter to the data read, and returns the filtered data to a process controller (e.g. core interface 308 in FIG. 3). Texture units 612(0, 1, ..., N−1) are connected to frame buffer partitions (i.e. memory0 through memoryN−1) 616(0, 1, ..., N−1) through a crossbar 614. Since any texture unit 612(0, 1, ..., N−1) may access data in any memory partition, the crossbar 614 is used provide this access by routing data between texture units 612(0, 1, ..., N−1) and the different memory partitions 616(0, 1, ..., N−1). Although a memory controller is not shown in FIG. 6, those skilled in the art will realize that a memory controller is used to control the reading and writing of data to the different memory partitions 616(0, 1, ..., N−1).

ROPs 618(0, 1, ..., N−1) are coupled to cores 310 which run the pixel shader programs 624(0, 1, ..., N−1). In one embodiment, ROPs 618(0, 1, ..., N−1) are coupled directly or indirectly to the cores 310 without a crossbar. The Z-processing modules 620(0, 1, ..., N−1) and the color processing module 622(0, 1, ..., N−1) located in ROPs 618(0, 1, ..., N−1), respectively, are coupled to their respective memory partitions 616(0, 1, ..., N−1) without a crossbar. For example, Z-processing module 620(0) and color processing module 622(0) are each coupled to memory 616(0) without a crossbar. Similarly, Z-processing module 620(1) and color processing module 622(1) are each coupled to memory 616(1) without a crossbar, and so on. In some embodiments of the invention, the ROPs 618(0, 1, ..., N−1) are connected directly to the cores 310(0, 1, ..., N−1) running the pixel shader 622(0, 1, ..., N−1) whereas in other embodiments other components are positioned in between which are not crossbars. Similarly, in some embodiments the Z-processing modules 620(0, 1, ..., N−1) and the color processing modules 622(0, 1, ..., N−1) are connected directly to their respective memory partitions 616(0, 1, ..., N−1) without a crossbar, whereas in other embodiments other components are positioned in between which are not crossbars.

In a multipipe graphics system utilizing this embodiment of the invention, the ROPs 618(0, 1, ..., N−1) are connected directly to memory controllers associated with memories 616 (0, 1, ..., N−1). However, in the prior art a second crossbar is used between the cores 310(0, 1, ..., N−1) that run the pixel shaders 622(0, 1, ..., N−1) and the ROPs 618(0, 1, ..., N−1). This second crossbar is used because in the prior art the various surfaces associated with the processing of a given pixel may be mapped to different memories. Although this embodiment of the invention still includes a crossbar 614 between texture units 612(0, 1, ..., N−1) and memories 616(0, 1, ..., N−1), the crossbars between the cores 310(0, 1, ..., N−1) and the ROPs 618(0, 1, ..., N−1) have been removed. In one embodiment of the invention, the removal of the crossbars is accomplished by using hardware that carries out specific mapping algorithms where pixel elements, which include pixel attributes, are mapped to partitions and memory addresses within partitions.

According to one embodiment of the invention, ElementStrides are used to map the pixel elements. An ElementStride is a value in pixel element units chosen as a compromise between increased memory coherence within a partition (larger values) and load balancing resulting from a finer subdivision of work between partitions (smaller values). All of the surfaces (e.g. Z, color, alpha, etc.) which might be used as attributes in a given pixel element must have the same ElementStride. Once an ElementStride is chosen, mapping into a Partition is done using:

$$PartitionStride = ElementStride * ElementSize. \quad (1)$$

$$PhysicalAddress = \quad (2)$$
$$SurfaceOffset + ElementSize * (X + SurfaceWidth * Y)$$

$$Partition = (PhysicalAddress / PartitionStride) \% nPartitions \quad (3)$$

$$= ((SurfaceOffset + ElementSize * (X + SurfaceWidth * Y)) / \quad (4)$$
$$(ElementStride * ElementSize)) \% nPartitions$$

$$= (((SurfaceOffset / PartitionStride) \% nPartitions) + ((X + \quad (5)$$
$$SurfaceWidth * Y) / ElementStride) \% nPartitions) \% nPartitions$$

where:

PartitionStride is the number of bytes that separate partitions;

ElementStride is the number of elements that separate partitions;

ElementSize is the number of bytes in a pixel element;

PhysicalAddress is the memory address;

SurfaceOffset is the memory address where data stored for the surface begins;

SurfaceWidth is the width in pixels of the memory storing data for the surface;

nPartitions is the number of partitions;

(X, Y) is a pixel coordinate;

/ denotes integer division; and

% denotes the modulo operator.

In this embodiment of the invention, the ElementSize is cancelled out of equation (4) which involves (X, Y) mapping, as shown in equation (5). Therefore, the ElementSize only remains in the part of the equation (1) which determines the PartitionStride of the beginning of the surface, or surface alignment. Moreover, since the ElementSize cancels out of equation (3), the Partition does not depend on the ElementSize. Additionally, this embodiment of the invention includes constraints on the SurfaceOffset for pixel alignment. Examples of these constraints include:

$$(SurfaceOffset / PartitionStride) \% nPartitions = K \quad (6)$$

for all surfaces including pixel elements to be aligned. Substituting equation (1) into equation (6) results in:

$$SurfaceOffset / (ElementStride * ElementSize) \% nPartitions = K. \quad (7)$$

This constraint can be satisfied by requiring, for example, that SurfaceOffset/ElementSize be a multiple of nPartitions, which can be written as:

$$SurfaceOffset = C * ElementSize * nPartitions, \text{ where } C \text{ is a constant.} \quad (8)$$

In one embodiment of the invention, groups of pixels which are near each other in two dimensional Cartesian space are typically grouped into blocks, for instance, by interleaving bits of X and Y to form two dimensional tiles to increase memory coherence for accesses which have locality in two dimensions. In one embodiment where an 8×8-element two dimensional tile is used, the mapping into a Partition would be done using equations (1) through (8) except that the PhysicalAddress would be given by equation (9) below instead of equation (2). For an 8×8-element two dimensional tile, the PhysicalAddress is given by:

$$PhysicalAddress = SurfaceOffset + ElementSize * (X[2:0] + 8*Y[2:0] + 64*X[m:3] + 8*SurfaceWidth*Y[n:3]), \quad (9)$$

where the SurfaceWidth is constrained to be a multiple of 8 (i.e. the tile width).

In embodiments having an oversampled surface (i.e. multiple samples per pixel), the above formulas could be applied to these samples. The alignment and strides are advantageously constrained such that all samples in a pixel map to the same memory partition. A person of ordinary skill in the art with access to the present teachings will be able to determine appropriate alignment and strides for a particular sampling pattern. Applying the above formulas to samples could result in potentially better load-balancing. In some embodiments hardware can implement both paths under software control.

In some embodiments an application may render to both multisampled and aliased (one sample per pixel) surfaces. For example, aliased surfaces might be used for shadow or environment map passes, multisampled surfaces for the primary rendering pass, and additional aliased surfaces for a filtering/tone-mapping pass. Embodiments of the present invention can be used with such applications, so long as the set of buffers being written to in a single pass all have the same number of samples per pixel and same ElementStride.

Address mapping hardware implements the above formulas guaranteeing that pixels elements line up in memory partitions. Address mapping hardware removes the necessity of crossbars composed of tens of thousands of wires in current GPUs. An advantage of using address mapping hardware instead of crossbars is that improvements in GPU performance can be made cheaper and faster because when the number of parallel ROPs is doubled the number of wires in a crossbar is increased by a factor of four.

In the embodiment illustrated in FIG. 6, the color and Z data follow the same screen mapping as the shader. The addressing to map the color and Z to exactly the same screen mapping as is done for the shader is determined using the calculations discussed above. Although the texture unit remains connected to the frame buffer through a crossbar, the color and Z-data are directly connected to the frame buffer. Since texture data is deliverable from any memory location to any pixel shader, the texture unit is still connected to the frame buffer through a crossbar. However, since identical numbers of shaders and frame buffer partitions can be established and the range of addressing can be fixed so that all the pixel data in one screen map tile resides in that frame buffer, there is no need for a crossbar between the frame buffers and the color and Z processors.

In the illustrated example there is a one-to-one correspondence between shaders and frame buffers. However, in other examples there can be two shaders per frame buffer or two frame buffers per shader. Those skilled in the art will realize that other combinations are possible and that the invention is not limited to any specific correspondence between the shaders and the frame buffers.

Pixel shader 622(0, 1, ..., N−1) processes pixels which are composed of multiple elements which may be written to a number of surfaces, for example several color surfaces as well as a Z (depth buffer) surface. Each of these surfaces is composed of pixel elements where the elements in each surface may have different sizes than the elements in one or more of the other surfaces. All of the attributes of a pixel can be processed together in the pixel shader 622(0, 1, ..., N−1). After the pixel shading process is completed, the elements are delivered to their respective ROPs 618(0, 1, ..., N−1), which are typically aligned with the frame buffer 500. ROPs 618(0, 1, ..., N−1) processing for elements is independent for each element except that updates to memory are enabled or disabled by Z and Stencil tests. In the prior art, the Z-Stencil element may not be aligned to the corresponding elements in color surfaces, necessitating a crossbar between Z-Stencil test elements and Color processing modules to transmit the results of Z and Stencil tests to the Color processing modules 622.

One advantage of coupling the processing clusters 302 directly to the frame buffer 500 without crossbars between both the pixel shaders and ROP modules as well as between Z-Stencil modules and Color processing modules is that far fewer wires are used, reducing the cost of the GPU. Another advantage is that crossbars can cause increased latency as well as increased power consumption, both of which are reduced when the crossbar is removed. One more advantage is that it can be difficult to lay out and/or fabricate many wires, and reducing the number of wires makes the GPU easier to manufacture. These advantages, as well as others, can lead to significant performance and area improvements.

Figure 7A:
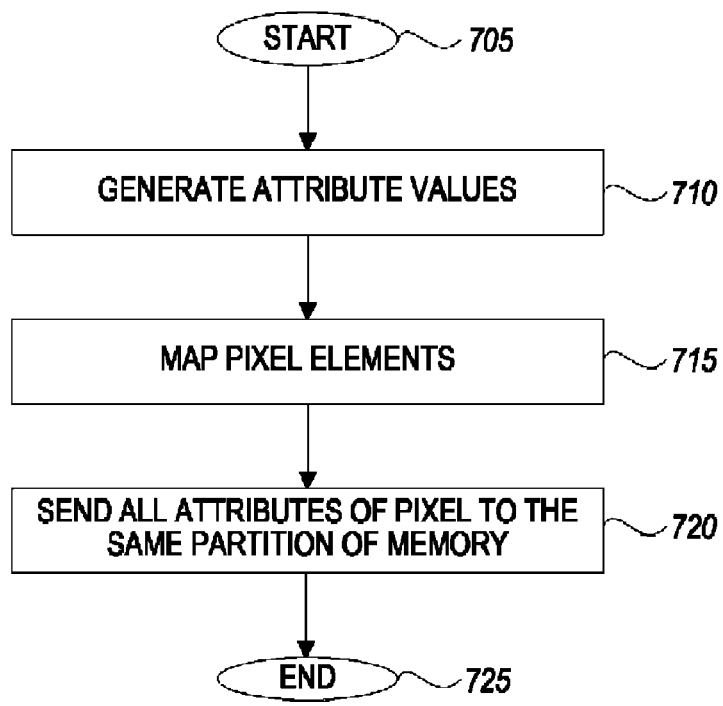
FIG. 7A is a flowchart illustrating the steps used to generate, map and send attributes of pixels from the ROP to the memory without a crossbar in accordance with an embodiment of the invention.

FIG. 7A is a flowchart illustrating the steps used to generate, map and send attributes of pixels from the ROP to the memory without a crossbar in accordance with an embodiment of the invention. The process starts in step 705 when there is pixel element data ready to be processed. In step 710 attribute values are determined for a plurality of pixel elements. These attribute values, which can include Z values, color values, alpha values, etc., are generated by the a multithreaded core array 202 and its processing clusters 302. Each processing cluster generates attribute values for a plurality of pixel elements being processed by that cluster. Pixels are advantageously assigned to a processing cluster based on screen location, e.g. as described above with reference to FIG. 4. The number of bytes in a surface of pixel elements being processed has ElementSize. In addition to determining attribute values in step 710, a constraint is also imposed on the PhysicalAddress. The constraint can include requiring that (SurfaceOffset/PartitionStride)%nPartitions is a constant K. In one embodiment, the constraint is imposed before any drawing or pixel shading is performed. Next in step 715, the pixel elements having (X,Y) values and an ElementSize are mapped from a plurality of independent surfaces to a plurality of memory partitions. Details of the mapping process are discussed below with reference to FIG. 7B. In step 720, the attribute values are sent directly to the memory using the mapping performed in step 715, without the use of a crossbar. Step 720 sends all the attributes of one pixel element to the same partition of the memory. By sending all of the attributes of one pixel element processed in one cluster to the same partition of the memory, the need for a crossbar between the ROP and the memory is removed. The process ends in step 725.

Figure 7B:
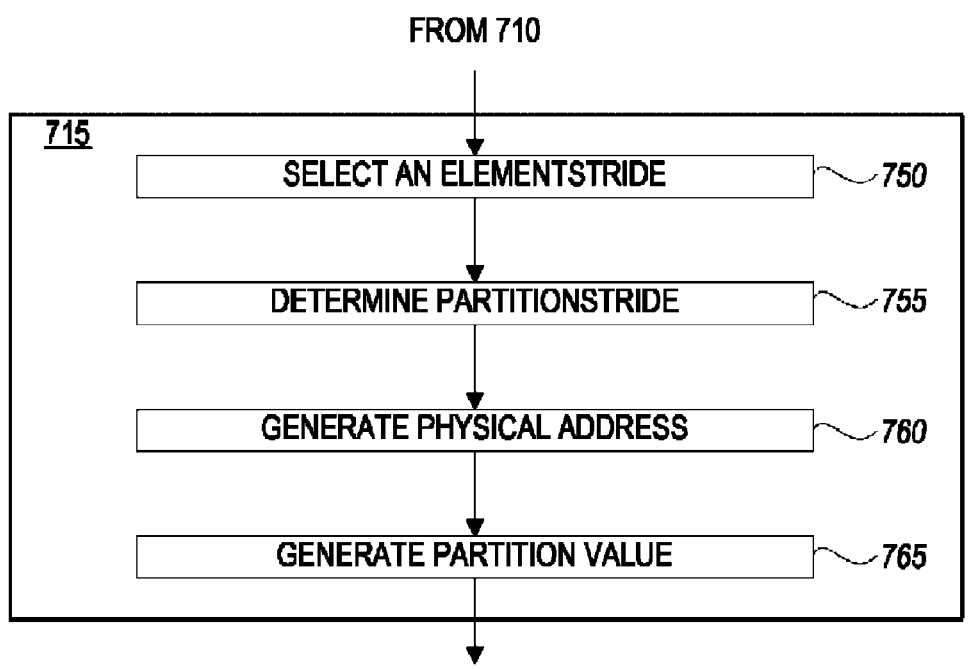
FIG. 7B is a flowchart illustrating further details of mapping step 715.

FIG. 7B is a flowchart illustrating further details of mapping step 715. In step 750 an ElementStride is identified. The ElementStride is setup by the application or driver for the entire CPU or for a specific application at setup. Next in step 755, the PartitionStride is determined by multiplying the ElementStride with the ElementSize. In step 760, the PhysicalAddress is generated by calculating SurfaceOffset+ElementSize*(X+SurfaceWidth*Y). Next in step 765, a Partition value is determined by the relationship (PhysicalAddress/PartitionStride)%nPartitions. Finally the process continues to step 720. Additional details of the calculations used to compute the mapping are described above with reference to FIG. 6.

Further Embodiments

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A method for writing graphics data to a memory comprising:
assigning each of a plurality of pixels to one of a plurality of pixel shaders based at least in part on a location of each of the plurality of pixels within an image area;
generating an attribute value for each of the plurality of pixels using the plurality of pixel shaders;
mapping the attribute value of each of the plurality of pixels to one of a plurality of memory partitions, wherein the attribute value generated by a particular one of the pixel shaders is mapped to the same one of the plurality of memory partitions; and
storing said attribute values in said memory partitions according to said mapping;
wherein each attribute value has an associated ElementSize and said mapping further includes selecting an ElementStride and determining a PartitionStride by multiplying the ElementStride with the ElementSize.

2. The method of claim 1 wherein each pixel has (X,Y) coordinates, the method further comprising generating a PhysicalAddress value equal to SurfaceOffset+ElementSize*(X+SurfaceWidth*Y), wherein said PhysicalAddress is an address in said memory where said attributes are sent.

3. The method of claim 2 further comprising generating a Partition value equal to (PhysicalAddress/PartitionStride)%nPartitions, wherein said Partition value is used to identify a partition in said memory.

4. The method of claim 2 further comprising imposing a further constraint on the PhysicalAddress.

5. The method of claim 4 wherein said constraint includes requiring that (SurfaceOffset/PartitionStride)%nPartitions is a constant K.

6. The method of claim 5 wherein said constraint is satisfied by setting SurfaceOffset/ElementSize to be a multiple of nPartitions.

7. A graphics processor comprising:
a multithreaded core array including a plurality of processing clusters, each processing cluster including at least one processing core operable to execute a pixel shader program that generates a pixel attribute value, wherein each of a plurality of pixels is assigned to one of the plurality of processing clusters based at least in part on a location of the pixel within an image area;

a pixel distribution logic configured to deliver a coverage data from a rasterizer to one of the processing clusters in the multithreaded core array, wherein the pixel distribution logic selects the one of the processing clusters to which the coverage data for a first pixel is delivered based at least in part on a location of the first pixel within an image area;

a plurality of raster operation units (ROPs), each ROP coupled to a different one of the plurality of processing clusters and adapted to be coupled to a different one of a plurality of memory partitions adapted to store pixel attribute values, wherein each memory partition stores pixel attribute values for pixels assigned to a different one of the plurality of processing clusters, and wherein each ROP is configured to update the pixel attribute values stored in the one of the memory partitions coupled thereto using the pixel attribute values generated by the one of the processing clusters coupled thereto;

wherein each pixel has (X,Y) coordinates, and wherein said ROP is further configured to:

select an ElementStride and determine a PartitionStride by multiplying the ElementStride with an ElementSize;

assign a PhysicalAddress value equal to SurfaceOffset+ElementSize*(X+SurfaceWidth*Y); and assign a Partition value equal to (PhysicalAddress/PartitionStride)%nPartitions.

8. The graphics processor of claim 7 wherein said ROP is further configured to impose a constraint on the PhysicalAddress.

9. The graphics processor of claim 8 wherein said constraint includes requiring that (SurfaceOffset/PartitionStride)%nPartitions is a constant K.

10. The graphics processor of claim 9 wherein said constraint is satisfied by setting SurfaceOffset/ElementSize to be a multiple of nPartitions.

* * * * *